UNITED STATES PATENT OFFICE.

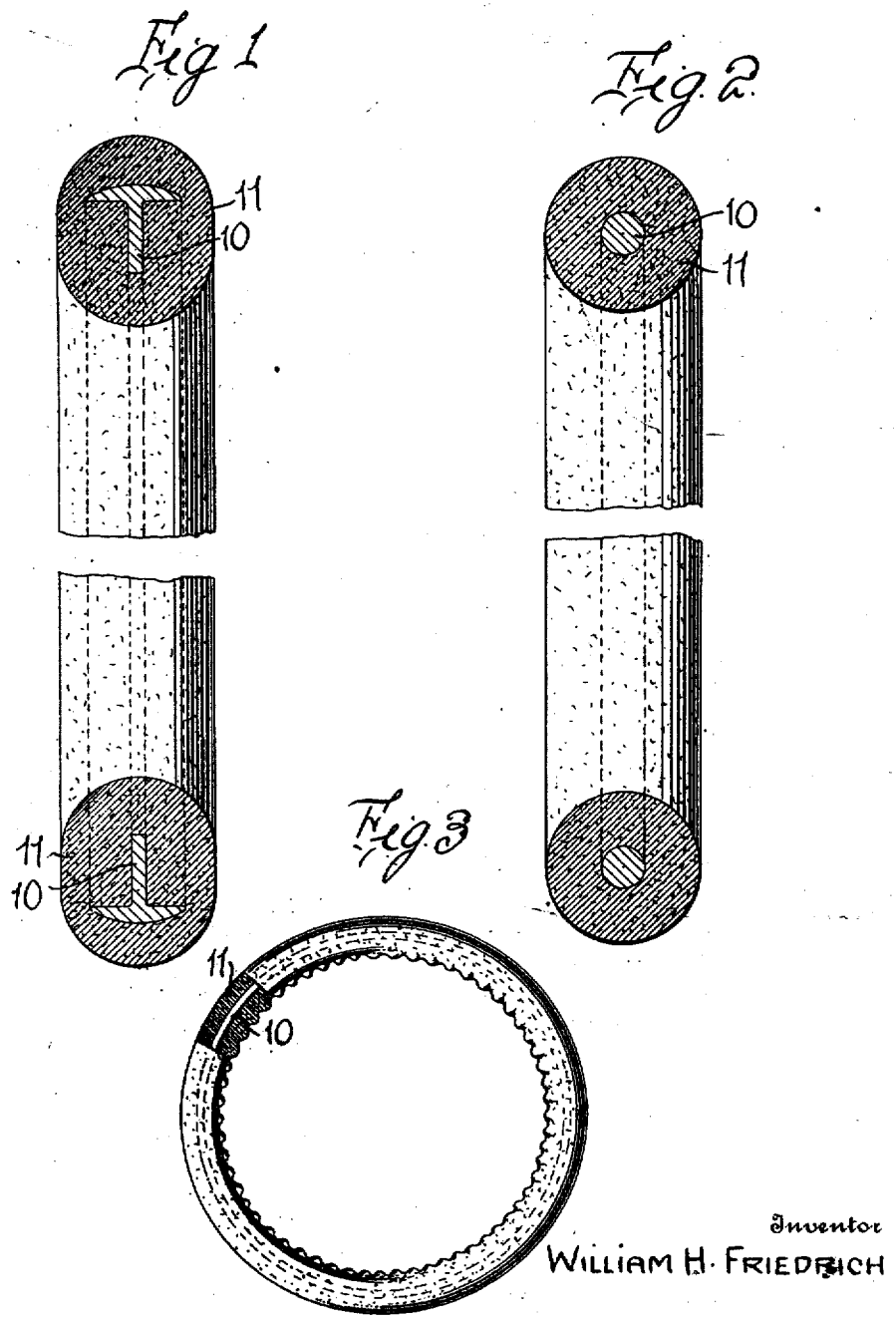

WILLIAM H. FRIEDRICH OF COLDWATER, MICHIGAN, ASSIGNOR, BY MESNE ASSIGNMENTS, TO W. H. FRIEDRICH & CO., A COPARTNERSHIP COMPOSED OF WILLIAM H. FRIEDRICH, CHARLES FRIEDRICH, AND JOHN FRIEDRICH.

COMPOSITION REINFORCED RING.

1,316,570.      Specification of Letters Patent.      Patented Sept. 23, 1919.

Application filed March 11, 1916. Serial No. 83,658.

*To all whom it may concern:*

Be it known that I, WILLIAM H. FRIEDRICH, a citizen of the United States, residing at Coldwater, in the county of Branch and State of Michigan, have invented certain new and useful Improvements in Composition Reinforced Rings, of which the following is a specification, reference being had to the accompanying drawings.

This invention relates to wooden rings such as are used in athletic apparatus, and also used for the steering wheels of automobiles and for various other purposes.

In the manufacture of wooden rings such as above described, and of relative large diameter, it has been found necessary that the rings in order to withstand the strain to which they are subjected shall be reinforced, and to this end it has been common practice to form the rings of two or three pieces or sections. These rings were usually made of hard maple and the great strain placed on the rings caused them to break due to the hardness of the wood and the crossing of the grain. Further it was almost impossible to so finish these rings that they were moisture proof, and thus even leaving aside their use out-of-doors where they were subjected to moisture, if a dealer carried them in the stock for a year or two, a large number of rings would show defects that caused them to be returned to the hands of a manufacturer.

It is the object of this present invention to provide a ring which shall be made of shavings, sawdust, or other wood refuse, and which shall be very strongly reinforced and capable of being waterproofed.

A further object of the invention is to provide wooden rings which shall have the same strength as iron or other metallic rings, but because of being of wood will not injure any one whom the ring may strike. This is very important in gymnasium rings, and rings used on children's playgrounds.

This invention is illustrated in the accompanying drawings wherein:

Figure 1 is a sectional view through one form of my composition ring;

Fig. 2 is a like view of another form; and

Fig. 3 is an elevation of a steering wheel of an automobile made in accordance with my invention.

Referring to these figures 10 designates a reinforcing metallic core which is annular in form, and which of course will be of a size depending upon the diameter of the ring and its purpose. Surrounding the core and completely inclosing it is the body of the ring designated 11 which is made of relatively thin wood shavings, sawdust or more or less comminuted or fragmentary wood refuse.

In manufacturing the rings the finely-ground material is thoroughly mixed with a binder such as thin glass, then a part of the material is placed in a ring mold, then the reinforcing core is disposed in the mold, and then the remainder of the fragmentary material mixed with the binder is placed in the mold and the mold with the inclosed mass subjected to a very high degree of compression at a high temperature. The mold with the inclosed completed ring is then cooled the ring removed therefrom and finished.

While I do not wish to be limited to any particular form of reinforcement, in the larger rings, as for instance, from 12" to 20" diameter, the reinforcement is preferably approximately T-shaped in cross section with the flanged portion of the reinforcing core disposed toward the outside of the ring. Where small rings are manufactured, however, the core may have a simpler form, as in Fig. 2, and I do not wish to be limited therefore to the particular form of core illustrated.

It has been found in practice that rings made as above described are absolutely moisture proof which is a very desirable feature for wooden rings which are to be subjected to the action of moisture. Experience has shown that rings, as above described, are superior to solid wood rings and much stronger than solid wood rings. This strength is, of course, secured very largely through the use of the metallic core. The rings have the same character as those made of hard wood, but are of far greater tensile strength and are not liable to split or come apart as are rings made up of glued section, but on the other hand, will thoroughly withstand moisture. Rings made in accordance with my invention are homogeneous, dense, and without any solution of continuity, that is there is no break or line of division between the particles or between one portion of the ring or article and another portion. Rings, or annuli made up as above described may be used for a large number of different purposes unnecessary to state, and in Fig. 3 I have shown my invention as applied in the manufacture of steering wheels of automobiles. This wheel also is made up in the manner heretofore described of more or less comminuted wood and a metallic core.

Attention is again called to the fact that in the manufacture of these rings, shavings may be used, such shavings having a length of three or four inches even, or that sawdust or more or less comminuted wood refuse may be used, and it is to be understood that by the term "comminuted" as used in the claim, I intend to include any wood or like material in relatively small thin strips or in small fragments.

Having thus described my invention, what I claim is:

An article of manufacture comprising an annular metallic core, an annular body surrounding and entirely inclosing the core and composed of highly compressed, more or less comminuted wood, and a binder, the body being without solution of continuity.

In testimony whereof I hereunto affix my signature in the presence of two witnesses.

WILLIAM H. FRIEDRICH.

Witnesses:
G. S. MILHAN,
G. F. HELLENBERG.